No. 744,308. PATENTED NOV. 17, 1903.
H. DE WALLACE.
GEAR CASE AND BRACKET.
APPLICATION FILED FEB. 24, 1902.
NO MODEL.
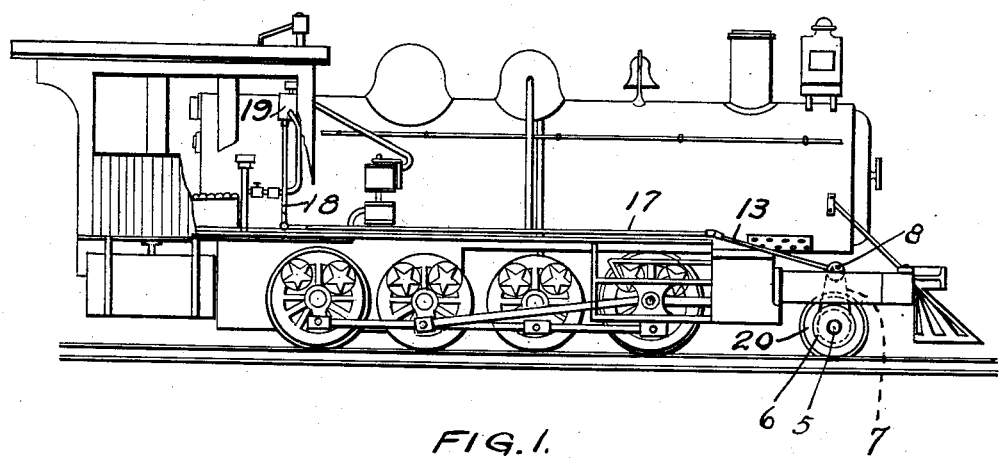
FIG. 1.
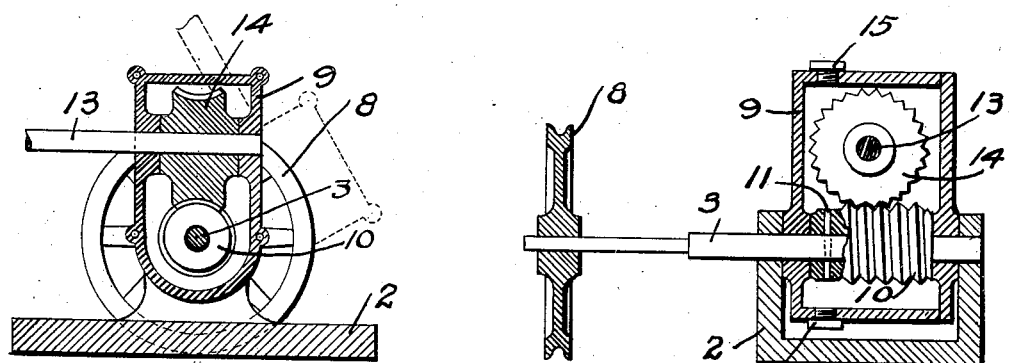
FIG. 2.
FIG. 3.
WITNESSES
E. G. Staude
O. G. Hanson
INVENTOR
HARRY DE WALLACE
BY Paul & Paul
HIS ATTORNEYS.

No. 744,308.  
Patented November 17, 1903.

UNITED STATES PATENT OFFICE.

HARRY DE WALLACE, OF WATERTOWN, NEW YORK.

GEAR-CASE AND BRACKET.

SPECIFICATION forming part of Letters Patent No. 744,308, dated November 17, 1903.

Original application filed May 16, 1901, Serial No. 60,543. Divided and this application filed February 24, 1902. Serial No. 95,297. (No model.)

*To all whom it may concern:*

Be it known that I, HARRY DE WALLACE, of Watertown, Jefferson county, New York, have invented certain new and useful Improvements in Gear-Cases and Brackets, of which the following is a specification.

This invention relates to improvements in gear-cases and brackets designed particularly for use in connection with train-order signals and train-stopping devices of the class that are described and claimed in Letters Patent heretofore issued to me and numbered and dated as follows: No. 617,232, dated January 3, 1899; No. 623,503, dated April 18, 1899; No. 642,303, dated January 30, 1900; No. 657,592, dated September 11, 1900, and also in my pending application for Letters Patent, filed May 16, 1901, Serial No. 60,543, of which this application is a division.

My present invention is designed to provide a simple and inexpensive bracket and gear-case that may be used between the truck of the locomotive and the train-order signal for the purpose of permitting the connecting-shaft to be set at any desired angle.

The invention consists generally in a bracket and gear-case, with a shaft mounted in bearings in the bracket and with the gear-case mounted upon said shaft and capable of swinging thereon and furnishing bearings for another shaft, said casing also inclosing suitable gears forming a connection between said shafts.

The invention consists, further, in the constructions and combinations hereinafter described, and particularly pointed out in the claims.

In the accompanying drawings, forming part of this specification, Figure 1 is a side elevation of a locomotive embodying my invention. Fig. 2 is a section of the bracket and gear-case. Fig. 3 is another section taken on a plane at right angles to the plane of Fig. 2.

In the drawings, 2 represents a bracket of any suitable construction and having preferably a suitable base and two upright standards forming bearings for a shaft 3. The bracket 2 is secured upon any suitable support, preferably upon the frame of the locomotive, with the shaft 3 parallel with the axles of the locomotive. I prefer to arrange this bracket substantially over the forward axle 5 of the locomotive, and said axle is preferably provided with a pulley 6, and a belt 7 (shown by dotted lines in Fig. 1) connects said pulley with the pulley 8 upon the shaft 3. By this means the shaft 3 is driven from the axle 5 and in either direction as the locomotive runs forward or back. A suitable casing 9 is mounted upon the shaft 3 between the standards of the bracket 2. Arranged upon the shaft 3 is a suitable worm-gear 10, preferably secured in position by means of a pin 11. This pin is preferably arranged opposite an opening in the casing that is closed by a threaded plug 12. By removing this plug the pin 11 can be removed and the shaft 3 withdrawn, permitting the casing 9 to be removed from the bracket. One side of the casing 9 is preferably made removable, and it may be secured in position by screws or other suitable means. A shaft 13 is provided with bearings in the casing 9, said shaft extending at right angles to the shaft 3. A worm-gear 14 is arranged upon the shaft 13 within the casing 9 and engages the worm 10 upon the shaft 3. The casing 9 is made oil-tight and is provided at its top with an opening having a threaded plug 15. By removing this plug the casing may be partially filled with oil, and this oil lies at the bottom of the casing. The worm turning in this casing gathers up the oil, and as the worm revolves quite rapidly, even at a moderate speed of the locomotive, it throws the oil in every direction, thus lubricating all the working parts and bearings perfectly. The shaft 13 may extend in any direction from the casing 9, said casing being adjustable around the shaft 3 to accommodate itself to the position of the shaft 13. As shown in Fig. 1 of the drawings, the shaft 13 extends on an incline from the casing 9 and is coupled to a shaft 17, that is in turn coupled to a shaft 18, leading to the train-order signal 19 in the cab of the locomotive. The pulley or sheave 8 is adjustable lengthwise from the shaft 3, so as to bring it directly over the pulley or sheave 6 upon the locomotive-axle. The sheave 6 may be located inside or outside of the wheel 20, and the sheave 8 will then be adjusted on the shaft 3 to accommodate itself in position to the sheave 6. As the casing 9 turns freely upon the shaft 3, it will be seen that the shaft 13 may be arranged horizontally, vertically, or in any intermediate position.

While I have shown and described this bracket and gear-casing as applicable particularly to locomotives equipped with my train-order signal, I do not confine myself to its use in this particular connection, as I believe that the same may be used to advantage for many other purposes.

I claim as my invention and desire to secure by Letters Patent—

1. The combination, with a suitable base plate or bracket, provided with suitable standards, of a shaft mounted in said standards, a casing mounted upon said shaft, a gear upon said shaft within said casing, a second shaft having bearings in said casings and a gear upon the second-named shaft engaging a gear upon the first-named shaft, substantially as described.

2. The combination, with a suitable base or bracket, provided with suitable standards, of a shaft mounted in said standards, a casing mounted upon said shaft and capable of turning thereon, a worm upon said shaft within said casing, a second shaft mounted in bearings in said casing and extending forward at right angles to first-named shaft and provided with a gear or pinion engaging said worm, substantially as described.

3. The combination, with the bracket, provided with suitable standards, of the shaft 3, mounted in said standards, the oil-tight casing 9 arranged upon said shaft, the worm 10 arranged upon said shaft within said casing, the shaft 13 mounted in bearings in said casing and the gear 14 mounted upon the shaft 13 and engaging in the worm 10, substantially as described.

In testimony whereof I have hereunto set my hand this 14th day of February, 1902.

HARRY DE WALLACE.

Witnesses:
H. J. McCORMICK,
THOS. BURNS.